March 2, 1954  V. K. ZWORYKIN ET AL  2,671,128
MICROSCOPY SYSTEM
Filed July 31, 1951  2 Sheets-Sheet 1

INVENTORS
VLADIMIR K. ZWORYKIN
& EDWARD G. RAMBERG
BY
ATTORNEY

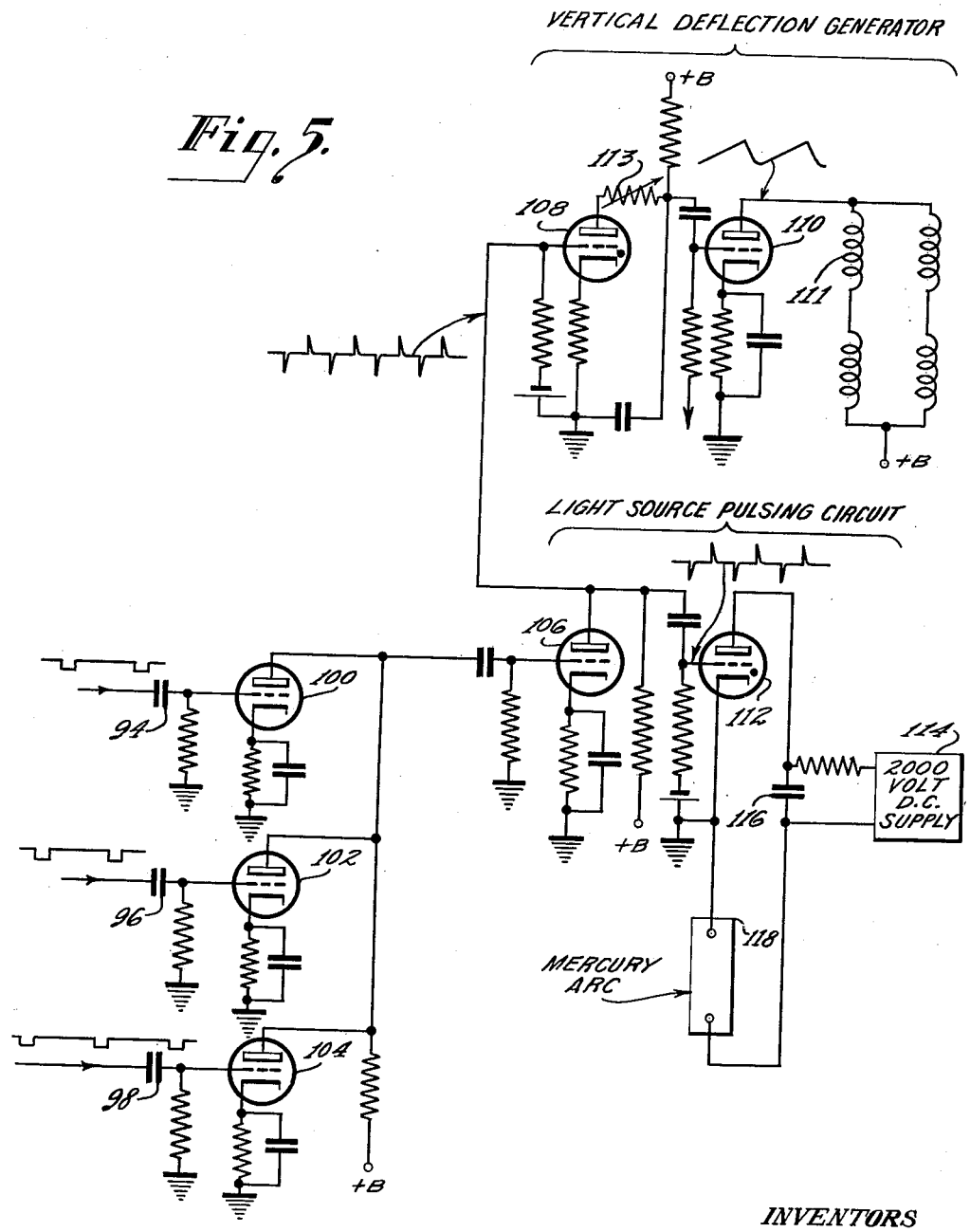

Patented Mar. 2, 1954

2,671,128

UNITED STATES PATENT OFFICE 2,671,128

MICROSCOPY SYSTEM

Vladimir K. Zworykin, Princeton Township, Mercer County, N. J., and Edward G. Ramberg, Huntingdon Valley, Pa., assignors to Radio Corporation of America, a corporation of Delaware Application July 31, 1951, Serial No. 239,534

10 Claims. (Cl. 178—5.2)

This invention relates to systems of microscopy and more particularly to an improvement in television microscopy systems.

Many microspecimens, which show little structure when observed in a visible light microscope, have distinctive absorptions for certain wavelengths in the ultraviolet spectrum.

It is an object of the present invention to provide a novel system whereby, in a directly viewed image of the object, these differences in wavelength absorption, or in transmission characteristics, are translated into color differences.

A further object of the present invention is to provide a novel and simple wavelength separation system for illuminating a microspecimen sequentially with these wavelengths.

It is still a further object of the present invention to provide a novel and useful microscopy system wherein a television system is used to observe a microspecimen being illuminated by a number of wavelengths, which are invisible to the eye, to provide visible images of the microspecimen in a sequence of images, the colors of which are associated with each of the wavelengths.

These and further objects of the present invention are achieved by permitting a source of light, including the desired wavelengths, to shine upon a monochromator including an uncorrected telescope lens. This serves to separate the light into its component wavelengths. A rotatable recessed sector disc and a light slit in an opaque body are positioned with respect to the telescope lens so that only the desired wavelengths are focussed in sequence upon the exit slit. A microspecimen is positioned in a microscope to be illuminated by the light coming through the exit slit. A television camera, which is sensitive to the selected wavelengths, is positioned to inspect the specimen through the microscope. A kinescope, having means to display signals applied thereto in color, has the output of the camera applied thereto. However, the application of the video signals to the kinescope tube is also controlled by the rotatable disc so that the color of the image displayed by the kinescope is associated with one of the selected wavelengths which illuminates the specimen at the time or immediately preceding it.

Figure 1:
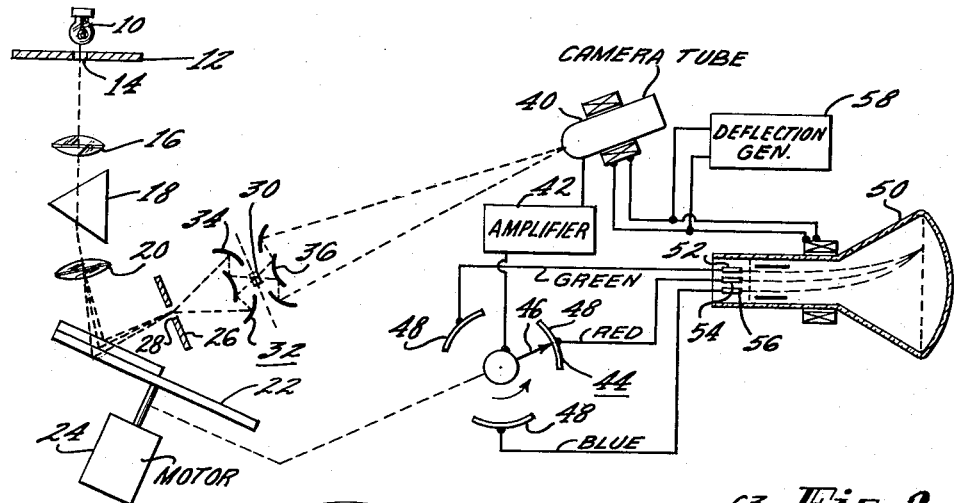
Figures 2, 3:
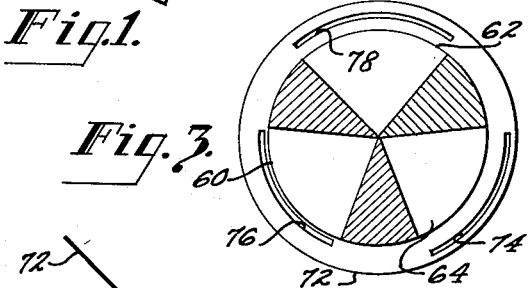
Figure 4:
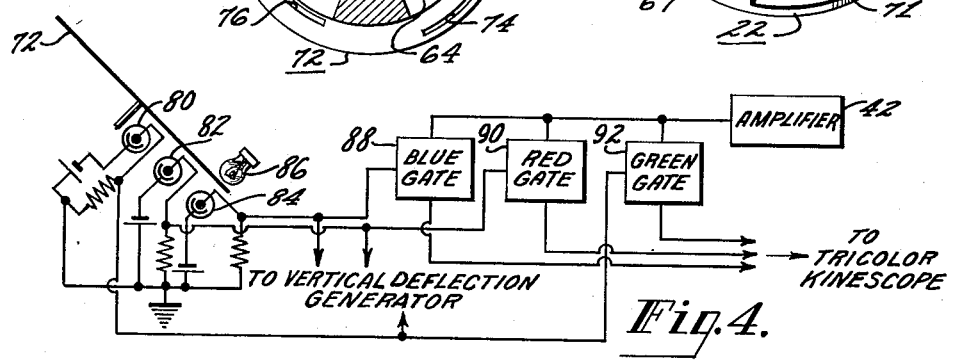
Figure 6:
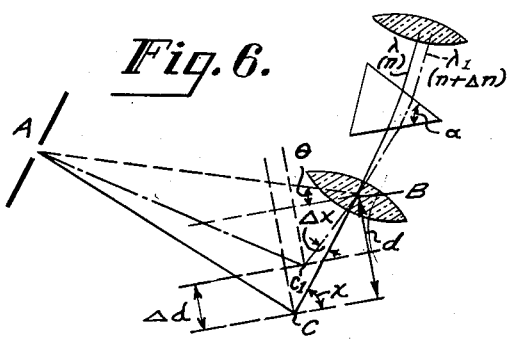

The novel features of the invention as well as the invention itself, both as to its organization and method of operation, will best be understood from the following description, when read in connection with the accompanying drawing in which, Figure 1 is a schematic diagram of an embodiment of the invention, Figure 2 is a view in perspective of a sector disc, Figure 3 is a plan view of a sector disc having gating control slots at its periphery, Figure 4 is a schematic diagram of an end view of the sector disc of Figure 3 showing the positioning of a light and photocells at the disc gating control slits to control the kinescope color gating, Figure 5 is a circuit diagram showing a system for synchronizing the vertical deflection of the camera tube and kinescope with the motion of the sector disc, and Figure 6 is a schematic diagram of a collimator and a geometric construction to show how the dimension of the sector disc recessions are calculated.

The description of an embodiment of the invention which follows herein is made with specific reference to the use of ultraviolet light. However, this is not to be considered as a limitation upon the invention. Other wavelengths for microspecimen study may be employed using the techniques and apparatus herein described. The description in connection with ultraviolet wavelengths is made for the purpose of simplification and to assist in a better understanding of the invention.

Reference is now made to Figure 1 of the drawings wherein there is shown a schematic diagram of an embodiment of the invention. A source of light 10, which in this instance may be a medium pressure mercury arc, illuminates the entrance slit 14 of a quartz monochromator. The entrance slit 14 is in an opaque body 12 having a slit 14 therein to permit light to shine through. The monochromator also includes an achromatic collimator lens 16 followed by a prism 18 which is followed by a simple uncorrected telescope lens 20. The prism 18 and lens 20 may be made of quartz. The light, which passes through the entrance slit, passes through the collimator, the prism, and through the telescope lens to fall upon a rotating, reflecting sector disc 22. This disc is rotated by a motor 24 and has three 120-degree sectors which are parallel to each other but which are recessed axially from one another by distances which are dependent upon the wavelengths of light which are selected to illuminate a microspecimen. The reflecting sector disc 22 is further described herein in connection with Figure 2. The angle of inclination made by the reflecting areas of the sector disc with the incident light from the telescope lens 20 is so adjusted that, in view of the chromatic aberration of the telescope lens 20, reflection at the three 120-degree sectors of the disc causes an image of the entrance slit 14 to be in focus upon a properly positioned exit slit 28 in an opaque body 26, for three selected wavelengths in the ultraviolet region.

The light passing through the exit slit illuminates a microspecimen 30 through an achromatic reflective condenser system 34 of a microscope 32. An achromatic reflector objective 36 images the specimen and eventually with the assistance of additional achromatic magnifying stages (not shown), the specimen can be observed.

For such observation a television camera tube 40 is provided and is positioned to scan the image of the micro-specimen 30. The television camera 40 includes a tube, such as a "Vidicon," having an ultraviolet transmissive face plate and an appropriate photo target. It is to be understood that if a microspecimen is to be studied at other selected wavelengths, the camera should be selected to respond thereto. In successive one-sixtieth of a second periods (or any other field periods which may be selected), corresponding to complete field scans including field return time, this camera tube generates picture signals corresponding to the transmission of the specimen for each of the three selected wavelengths. The video signal output of the camera is amplified by an amplifier 42 and is then applied to a tri-color kinescope 50 in a fashion so that each one of the selected wavelengths may be identified by an associated color with which the object under study is displayed on the screen of the kinescope tube. This is accomplished by applying the signals to the rotor contact 46 of a rotary selector switch 44. The three stators 48 of the rotary selector switch are respectively connected to the green, red, and blue electron guns 52, 54, 56 of the tri-color kinescope. This tri-color kinescope may be of the type described and claimed in a U. S. Patent to Goldsmith, No. 2,481,839, issued September 13, 1949, for "Color Television." The rotary switch rotor is ganged to the shaft of the motor that is used to drive the rotary disc and is driven in synchronism therewith. Thereby, the association of a color to a selected wavelength is maintained. A deflection generator 58 is used to generate common deflection signals for both the camera tube 40 and the kinescope 50, the field deflection being synchronized with the sector rotation (one sector rotation=three field periods), as indicated below.

The proportioning of the camera flyback, or vertical blanking time as well as its scanning time, and the spacing of the reflective and non-reflective areas of the sector disc face relative to the scanning process depends on the type of camera tube employed. With a storage tube such as the "Vidicon," it is advantageous to make the vertical return time long (equal to the scanning time, for example) and to let the time during which the beam from the monochromator rests on a reflecting portion of the sector disc coincide with the vertical flyback time preceding the scanning period for the corresponding picture.

Referring now to Figure 2, there may be seen a perspective view of a sector disc 22. Each of the three parallel sectors 60, 62, 64 has a reflecting 61, 63, 65 and non-reflecting 67, 69, 71 portion and is recessed from the other sectors along the axis of the disc. A reflecting portion of the sector is chosen in accordance with a desired image scanning time, namely, such that light reaches the exit slit 28 only during return trace (vertical blanking). The distances between the planes of each sector of the disc is determined by the wavelengths at which it is desired to view the microspecimen. These computations are subsequently shown.

Another system for gating the video signals properly in order to secure correct color association with the three selected wavelengths may be seen by referring to Figure 3. Figure 3 shows a plan view of a sector disc 72 wherein the periphery of the disc is extended a sufficient amount to permit the inclusion of three arcuate slots 74, 76, 78. The slots extend in an arc which is the approximate width of each non-reflecting sector preceding reflecting sectors 61, 63, 65, but each slot is offset from the other.

Referring now to Figure 4, the sector disc 72 is shown edgewise. Three photocells 80, 82, 84 are positioned on one side of the disc to receive light provided by a source 86. The photocells, however, are so positioned that they receive light through only one of the arcuate slots 74, 76, 78. The one slot through which the light shines is determined by the disc position or by the reflecting sector which it precedes. Each one of the photocells is respectively connected to a blue gate 88, a red gate 90, and a green gate 92. These gates also have applied thereto a video signal from the video amplifier 42. The gates may be any of the well known types such as a multigrid tube wherein the tube is normally biased to be non-conducting until a signal to overcome the bias is applied to one of the tube grids, whereupon a signal which is being applied to the tube control grid may be amplified and passed by the tube. The output of each of these gates is applied to a respective electron gun of a tri-color kinescope tube 50 of the type shown in Figure 1. Accordingly, the video signal, which is seen on the screen of the kinescope tube, will have a color which identifies it as being scanned at that time by the selected wavelength associated with such color.

Figure 5 shows a circuit diagram of the manner in which the vertical deflection of the camera tube and color kinescope may be synchronized with the motion of the reflecting disc shown in Fig. 3. The outputs of the three phototubes 80, 82, 84 shown in Figure 4 represent negative pulses of width corresponding to the individual slot lengths and the speed of rotation of the disk. Besides being applied to the three gates 88, 90 and 92, a portion of the outputs from the phototubes is passed through differentiating networks 94, 96, 98 of small time constant and applied to three amplifiers 100, 102, 104 whose outputs are added. After an additional phase-reversing stage 106 of amplification, the sum of the differentiated pulses is utilized to synchronize the vertical deflection generator. Positive pulses, in the differentiated pulse train, corresponding to the end of the transit of any one slot in front of the light source act as trigger pulses, initiating the return trace. In the circuit shown, the vertical deflection generator includes a sawtooth generator 108 which uses a thyratron type tube and an amplifier 110 whose output is applied to the vertical deflection coils 111. The vertical return trace period is lengthened by the insertion of a variable resistance 113 into the condenser discharge circuit. This resistor 113 has its value so adjusted that the discharge time or return trace period matches the interval between the scanning of successive slots by the light source, so that the forward scan corresponds to the period during which any one slot is scanned by the light source. Blanking signals for the camera tube and kinescope may be obtained directly by combining the photocell output pulses and utilizing the pulses in the resultant pulse train for this purpose.

In the systems shown above the divisions of the sectors of the disc into reflecting and non-reflecting portions determines the period during which the exit slit 28 is illuminated. However, the reflecting sectors must subtend smaller angles than the interval between successive slots to account for the overlap of the interrupted light beam since the beam does have a definite width.

It is possible to pulse the source of ultraviolet light 10 at the beginning of each blanking period. With this type of operation, the entire disc may be made reflecting, since the light may be kept off during the interval corresponding to what was previously a non-reflecting interval. The circuit for accomplishing this is shown in Figure 5, where a thyratron 112 is coupled to the amplifier 106 output. A high voltage source 114 charges up a condenser 116 which discharges through the thyratron 112 when it is pulsed, and through a mercury arc tube 118 causing the tube to become illuminating. Both tube 108 and tube 112 are rendered conducting together. Details of this type of light source may be found in an article by S. L. Bellinger, "High-Speed Photolight," General Electric Review, vol. 47, pp. 31-33, March 1944. The use of a high-speed, high intensity pulsed light source with a short duration of luminosity make it possible to reduce the flyback time and increase the relative length of the periods during which the picture is reproduced, reducing flicker effects. A lower limit to the blanking period is set by the angle subtended by the beam cross section on the reflecting disc. This may be reduced by increasing the disc size.

As an alternative to pulsing the light source or using non-reflecting areas on the disc, a shutter disc (not shown) synchronized with the reflecting disc may be inserted between the entrance slit and monochromator. This shutter disc will have openings to permit light passage for the desired object illuminating intervals.

In place of a tri-color kinescope tube 50, as shown in the drawings, an ordinary monochrome kinescope tube may be used with a color wheel positioned between an observer and the screen of the tube. The color wheel may be of the type which includes three transparent gelatins, namely, red, green, and blue. The color wheel rotates at a frequency which is controlled by the means which rotates the disc so that each of the colors of the color wheel is associated with a wavelength. The video signal is applied to the kinescope at all times in this instance, except during vertical return time.

In an embodiment of the invention which was built, three wavelengths were of interest: 2537, 3130, and 4358 A. U. The red, green, and blue guns of a tri-color kinescope were respectively associated with each one of these wavelengths in the manner described above. A high transmission of 2537 A. U. produced a high intensity of the red component, a high transmission of 3130 A. U. produced a high intensity of the green component, and a high transmission of 4358 A. U. provided a high intensity of the blue component. White portions of the image correspond to equal transmission by the microspecimen for all wavelengths. A saturation red corresponded to 2537 A. U. only, a blue-green transmission corresponded to absorption of 2537 only.

Referring now to Figure 6, there may be seen a schematic diagram and a geometric construction of a collimator and sector disc for the purpose of illustrating how the sector disc plane distances are determined.

In the drawing, the letters have the following significance:

$\lambda$, wavelength of the principal light ray
$n$, refractive index of the principal ray
$\lambda_1$, wavelength of next light ray
$n+\Delta n$, refractive index of next light ray
$\alpha$, angle made by the sides of the prism through which the light rays pass
$x$, glancing angle of incidence on the disc (of principal ray)
$\Delta x \cong -\alpha \Delta n$, dispersion of the prism
$f$, focal length of the telescopic lens
$f = ACB$ $$\Delta f = -\frac{f \Delta n}{n-1}$$

chromatic aberration of the lens
$\theta$, angle of line connecting center of telescope lens with the exit slit relative to the plane of the sector
$d$, perpendicular distance of B from the reflecting plane $$d = \frac{AB}{2}(\cos \theta \tan x - \sin \theta)$$

relation between $d$ and $x$ $$ACB = f = \frac{AB \cos \theta}{\cos x}$$

Therefore $\Delta f = f \tan x \Delta x \cong -f\alpha \tan x \Delta n$. This must equal the previously derived value of $\Delta f$ if the image of the slit is to remain in focus as the level of the reflecting plane and hence the wavelength of the ray reaching the exit slit is changed. The condition is fulfilled when, $$\alpha \tan x \cong \frac{1}{n-1}$$

where $\alpha$ is measured in radians. Since $\tan x$ can range from 0 to infinity, this condition can always be fulfilled. The corresponding displacement in level of the reflecting surface is, $$\Delta d = \frac{AB}{2} \cos \theta \sec^2 x \Delta x$$

As an example, $\lambda = 3130$ A. U.    $\lambda_1 = 2537$ A. U.    $\lambda_2 = 4358$ A. U.    $\alpha = 1 (\sim 60°)$
$n = 1.5737$    $n = 1.5980$    $n = 1.5540$
    $\Delta n_1 = 0.0243$    $\Delta n_2 = -0.0197$
    $\therefore \tan x = 1.745, x = 60°$ Choose, for example, $$\theta = 0, \quad AB = 8 \text{ cm.}$$
$$\therefore d = 7 \text{ cm.}, f = 16 \text{ cm.}$$
$$\Delta d_1 = 16 \Delta x, \cong -16 \Delta n_1 = -0.39 \text{ cm.}$$
$$\Delta d_2 = \cong -16 \Delta n_2 = +0.315 \text{ cm.}$$

Accordingly, for a 60 degree glancing angle and for a distance between the telescope lens and the exit slit of 8 cm. (parallel to the sector disc surface), steps of 3 and 4 mm. respectively are required to shift focus from 3130 to 4358 and 2537 A. U. respectively. These computations are for an achromatic collimator lens. With an uncorrected collimator lens of the same focal lens as the telescope lens, the effective chromatic aberration would be doubled and the glancing angle would have to be increased to 74 degrees, the distance $d$ would be doubled, the focal length almost doubled, and the steps made almost four times as large (for distance between plate and lens unaltered). For equal focal length, the glancing angle is increased to 74°, AB is reduced almost by a factor of ½, $d$ increased very slightly, and the steps are almost doubled.

From the foregoing description, it will be apparent that there has been described herein a system whereby differences in spectral transmission of a microspecimen to different wavelengths are translated into color differences. There has further been shown and described a novel and simple system for illuminating a microspecimen with several selected wavelengths. The system also permits a visual observation of a microspecimen which is being illuminated by selected wavelengths of light in a non-visible portion of the light spectrum.

What is claimed is:

1. A system for translating the differences in spectral transmission of an object to selected light wavelengths into color differences comprising a source of light including said selected wavelengths, means upon which said light is focussed to separate said light into a number of wavelengths including said selected wavelengths, means to separate and sequentially reflect said selected wavelengths upon said object, means to generate video signals responsive to the transmission of said object at said selected wavelengths, and means to which said video signals are applied to display an image of said object in a sequence of colors each of which is associated with one of said selected wavelengths whereby an image of said object is displayed on the screen of said kinescope in colors corresponding to its transmission at said selected wavelengths, said means to separate and sequentially reflect said selected wavelengths comprising a disc having a plurality of flat, parallel sectors equal in number to the number of said selected wavelengths, said sectors being recessed from each other along the disc axis by a distance dependent upon said selected wavelengths.

2. A system for translating the differences in spectral transmission of an object to selected wavelengths into color differences comprising a source of light including said selected wavelengths, means upon which said light is focussed to separate said light into a number of wavelengths including the wavelengths at which the object transmission is to be studied, means to separate and reflect in sequency each of said selected wavelengths upon said object, a television camera responsive to said wavelengths and positioned to scan said object, means to which video signal output from said camera is applied to display an image of said object in a sequence of colors each of which is associated with said selected wavelengths, whereby an image of said object is displayed on the screen of said kinescope in colors corresponding to its transmission at said selected wavelengths, said means to separate and reflect in sequency each of said selected wavelengths comprising a disc having a plurality of flat, parallel sectors, equal in number to the number of said selected wavelengths, said sectors being recessed from each other along the disc axis by a distance dependent upon said selected wavelengths, said disc including a mirror in each of its sectors.

3. A system for translating the differences in spectral transmission of an object to selected wavelengths into color differences comprising a source of light including said selected wavelengths, a monochromator through which said light passes to be separated into its component wavelengths, a sheet of opaque material having a light exit slit, means to reflect in sequence only said selected wavelengths upon said light exit slit, a microscope wherein said object is mounted, said light slit in said opaque material being positioned to permit only the light passing through said slit to illuminate said object, a television camera positioned to scan said object through said microscope, said camera providing video output signals responsive to the transmission of said object, a color kinescope, means responsive to said means to reflect in sequence to apply said video output signals to said kinescope to be displayed on the screen of said kinescope in a sequence of colors associated with said selected wavelengths whereby an image of said object is displayed on the screen of said kinescope in colors corresponding to its transmission at said selected wavelengths.

4. A system for translating the differences in spectral transmission of an object to selected wavelengths into color differences comprising a source of light including said selected wavelengths, a monochromator through which said light passes to be separated into its component wavelengths, including said selected wavelengths, an uncorrected telescope lens at its output, a sheet of opaque material having a light exit slit, rotatable means to reflect in sequence upon said exit slit only said selected wavelengths in said monochromator output, a microscope wherein said object is mounted, said light slit in said opaque material being positioned to permit the light passing through said slit to illuminate said object, a television camera positioned to scan said object through said microscope, said camera providing video output signals representative of the transmission of said object at each of said selected wavelengths, a color kinescope including means to determine the color displayed by said kinescope, means responsive to said rotatable means to apply said video output signals successively to said kinescope color determining means to associate a different color with the video signal from each of said transmitted selected wavelengths.

5. A system as recited in claim 4 wherein said rotatable means includes a disc having three, flat, parallel 120 degree sectors which are recessed from each other along the disc axis by a distance dependent upon the selected wavelengths, said disc including a mirror in each of its three sectors, and means to rotate said disc to successively reflect the selected wavelengths in the output from said monochromator onto said light exit slit.

6. A system as recited in claim 4 wherein the means to determine the color displayed by said kinescope consists of three electron guns in said kinescope, and said means responsive to said rotatable means to apply said video output signals successively to said kinescope includes a rotary switch having a rotary contact coupled to receive said viedo output from said camera, and a plurality of stationary contacts contacted in sequence by said rotary contact, each of said stationary contacts being coupled to a different one of said electron guns.

7. A system as recited in claim 4 wherein said rotatable means includes a disc having three flat, parallel 120 degree sectors which are recessed from each other along the disc axis by a distance dependent upon the selected wavelengths, said disc including a mirror in each of its three sectors, each of said sectors having an arcuate slot near the outer periphery of said sector at a different radial distance from the center, and said means responsive to said rotatable means to apply said video output signals successively to said kinescope color determining means includes a lamp positioned on one side of said disc opposite said three slots, three photocells positioned on the other side of said disc to receive illumination from said lamp only through an associated one of said slots, three normally non-conductive gating tubes, said video output from said camera being applied to all of said gating tubes, each of said photocells being coupled to an associated one of said gating tubes to render it conductive responsive to an output from said photocells, the output from each of said gates being applied to said kinescope color determining means.

8. A system for translating the differences in spectral transmission of an object to three selected ultraviolet light wavelengths into visible light color differences comprising a source of ultraviolet light including said selected wavelengths, a monochromator through which said light passes including a quartz prism and an uncorrected telescope lens following said prism, a disc having three flat parallel reflecting sectors which are recessed from each other by a distance along the disc axis dependent upon said three selected wavelengths, means to rotate said disc, an opaque body having a light exit slit, said disc being positioned with reference to said telescope lens and said light exit slit to reflect in focus each of said three selected wavelengths upon said exit slit, a microscope within which said object is mounted for observation, said microscope being positioned with reference to said exit slit to permit said object to be illuminated by the light passing therethrough, a television camera positioned to scan said object through said microscope, said camera providing video output signals representative of the transmission of said object at each of said three selected wavelengths, a tri-color kinescope, and means coupled to said means to rotate said disc to successively apply said video output signals to said kinescope to associate each color of the three colors of said kinescope with a video signal representative of the transmission of said object whereby said object is displayed on said kinescope in colors dependent upon the transmission of said object to said selected wavelengths.

9. In a system for translating differences in spectral transmission of an object to selected wavelengths into color differences, apparatus for separating said selected wavelengths from light including said wavelengths, said apparatus comprising a monochromator upon which said light shines, said monochromator having an uncorrected telescope lens at its output, an opaque body having a light exit slit, and a rotatable means positioned with respect to said telescope lens and said exit slit to sequentially reflect in focus upon said exit slit only said selected wavelengths, said rotatable means including a disc having three flat, parallel, 120-degree sectors recessed from each other along the disc axis by a distance dependent upon the selected wavelengths, said disc including a mirror in each of its three sectors, and means to rotate said disc to successively reflect the selected wavelengths in the output from said monochromator onto said light slit.

10. In a system for translating differences in spectral transmission of an object to selected wavelengths into color differences, apparatus for separating said selected wavelengths from light including said wavelengths, said apparatus comprising a monochromator upon which said light shines, said monochromator including a prism and an uncorrected telescope lens following said prism, an opaque body having a light exit slit, a disc having a number of flat, parallel reflecting sectors which are recessed from each other by a distance along the disc axis dependent upon said selected wavelengths, means to position said disc with reference to said telescope lens and said light slit to focus the selected wavelength reflected by the associated reflecting sector upon said light slit, and means to rotate said disc.

VLADIMIR K. ZWORYKIN.
EDWARD G. RAMBERG.

References Cited in the file of this patent
UNITED STATES PATENTS

| Number | Name | Date |
| --- | --- | --- |
| 2,163,540 | Clothier | June 20, 1939 |
| 2,378,746 | Beers | June 20, 1945 |
| 2,552,070 | Sziklai | May 8, 1951 |
| 2,567,240 | Sites | Sept. 11, 1951 |